United States Patent
Naravanekar (10) Patent No.: US 11,189,292 B2
(45) Date of Patent: *Nov. 30, 2021

(54) DETERMINING A TARGET DEVICE FOR VOICE COMMAND INTERACTION

(71) Applicant: Microsoft Technology Licensing, LLC, Redmond, WA (US)

(72) Inventor: Aniket Krishnat Naravanekar, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/839,872

(22) Filed: Apr. 3, 2020

(65) Prior Publication Data

US 2020/0234716 A1 Jul. 23, 2020

Related U.S. Application Data

(63) Continuation of application No. 15/638,002, filed on Jun. 29, 2017, now Pat. No. 10,636,428.

(51) Int. Cl.
*G10L 21/00* (2013.01)
*G10L 25/00* (2013.01)
(Continued)

(52) U.S. Cl.
CPC .............. *G10L 15/30* (2013.01); *G06F 3/167* (2013.01); *G10L 15/183* (2013.01); *G10L 15/22* (2013.01);
(Continued)

(58) Field of Classification Search
CPC ... G10L 15/22; G10L 2015/223; G10L 15/30;
G10L 2015/088; G10L 15/02; G10L 15/20; G10L 25/60; G10L 25/84; G10L 17/06; G10L 25/51; G10L 17/22; G10L 2021/02166; G10L 2021/02161; G10L 15/00; G10L 15/26; G10L 15/183; G06F 3/167; G06F 21/83; H04L 12/1822; H04L 63/0861; H04L 63/104; H04L 65/1063; H04L 65/1083; H04L 65/1096; H04L 65/4084; H04L 65/602; H04L 67/1095; H04L 67/12; H04L 12/1818; H04L 12/2803; H04L 12/2816; H04L 12/4625; H04L 27/122; H04L 41/069; H04L 43/18; H04L 51/32; H04L 63/0414; H04L 63/083; H04L 63/1416; H04L 63/1425;
(Continued)

(56) References Cited

U.S. PATENT DOCUMENTS

5,267,345 A 11/1993 Brown et al.
9,424,841 B2 8/2016 Foerster et al.
(Continued)

*Primary Examiner* — Michael Ortiz-Sanchez
(74) *Attorney, Agent, or Firm* — Alleman Hall Creasman & Tuttle LLP (57) ABSTRACT

Systems, methods, and devices for determining a target device for a voice command are provided. A voice command is detected at a plurality of devices. A weight is determined for the detected voice command at each device of the plurality of devices. The determined weight is exchanged among the plurality of devices. A highest weight among the exchanged weights is determined. The device associated with the highest weight is determined as the target device for the voice command.

19 Claims, 7 Drawing Sheets

(51) Int. Cl.
  *G10L 15/30* (2013.01)
  *G10L 15/183* (2013.01)
  *G10L 15/22* (2006.01)
  *G10L 17/22* (2013.01)
  *G06F 3/16* (2006.01)
  *G10L 15/26* (2006.01)

(52) U.S. Cl.
  CPC .............. *G10L 15/26* (2013.01); *G10L 17/22* (2013.01); *G10L 2015/223* (2013.01)

(58) Field of Classification Search
  CPC ............. H04L 65/1059; H04L 65/4015; H04L 65/4069; H04L 65/4076; H04L 65/4092; H04L 65/604; H04L 65/80; H04L 67/06; H04L 67/125; H04L 67/22; H04L 67/2847; H04L 67/303; H04L 67/306
  See application file for complete search history.

(56) References Cited

U.S. PATENT DOCUMENTS

| | | |
|---|---|---|
| 9,472,206 B2 | 10/2016 | Ady |
| 9,514,745 B2 | 12/2016 | Bush, III et al. |
| 10,636,428 B2 | 4/2020 | Naravanekar |
| 10,861,450 B2 * | 12/2020 | Tukka .................... G10L 15/22 |
| 2006/0074658 A1 | 4/2006 | Chadha |
| 2009/0299745 A1 | 12/2009 | Kennewick et al. |
| 2010/0332236 A1 | 12/2010 | Tan |
| 2012/0035935 A1 | 2/2012 | Park et al. |
| 2012/0197627 A1 | 8/2012 | Shi et al. |
| 2013/0183944 A1 | 7/2013 | Mozer et al. |
| 2013/0238326 A1 | 9/2013 | Kim et al. |
| 2015/0006184 A1 | 1/2015 | Marti et al. |
| 2015/0019225 A1 | 1/2015 | Sims, III |
| 2015/0142824 A1 | 5/2015 | Tipton et al. |
| 2015/0228274 A1 | 8/2015 | Leppanen et al. |
| 2016/0026621 A1 | 1/2016 | Misra et al. |
| 2016/0061600 A1 | 3/2016 | Dharawat et al. |
| 2016/0077794 A1 | 3/2016 | Kim et al. |
| 2016/0155443 A1 | 6/2016 | Khan et al. |
| 2016/0260431 A1 | 9/2016 | Newendorp et al. |
| 2017/0064412 A1 | 3/2017 | Taxier |
| 2017/0076720 A1 | 3/2017 | Gopalan et al. |
| 2017/0171221 A1 | 6/2017 | Ho et al. |

* cited by examiner

MOBILE COMPUTING DEVICE

DETERMINING A TARGET DEVICE FOR VOICE COMMAND INTERACTION

CROSS-REFERENCE TO RELATED APPLICATIONS

This application is a continuation of U.S. application Ser. No. 15/638,002, filed Jun. 29, 2017, entitled, "DETERMINING A TARGET DEVICE FOR VOICE COMMAND INTERACTION". The disclosure of this application is hereby incorporated by reference in its entirety into the present application.

BACKGROUND

A user generally has multiple voice command enabled devices in close proximity. When the user gives a voice command, multiple devices detect the voice command. Without a clear indication, each listening device responds to the voice command causing confusion.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for determining a target device for a voice command. For example, a voice command is detected at a plurality of devices. A weight is determined for the detected voice command at each device of the plurality of devices. The determined weight is exchanged with the other devices of the plurality of devices. The locally determined weight is compared with exchanged weights received from the other devices. One device of the plurality of devices associated with the highest weight among the exchanged weights is determined as the target device for the voice command. The determined target device from the plurality of devices is operable to respond to the voice command.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage device for determining a target device for a voice command. For example, a voice command is detected at a plurality of devices. A weight is determined for the detected voice command at each of the plurality of devices. The weight is determined based on one or more weight criteria. Each device of the plurality of devices is operable to exchange the determined weights with the other devices of the plurality of devices. The determined weight is exchanged as electrical signal, infra-red (IR) signal, light signal, or sound signal. Each device of the plurality of devices is operable to determine whether a local weight for the voice command is the highest weight among exchanged weights. One device of the plurality of devices is designated as the target device for the voice command when the determined weight at the one of the plurality of devices is the highest weight among the exchanged weights. The designated target device is operable to respond to the voice command. Advantageously, the disclosed methods and systems enable co-ordination between a plurality of voice enabled devices located within close proximity of each other.

Figure 1:
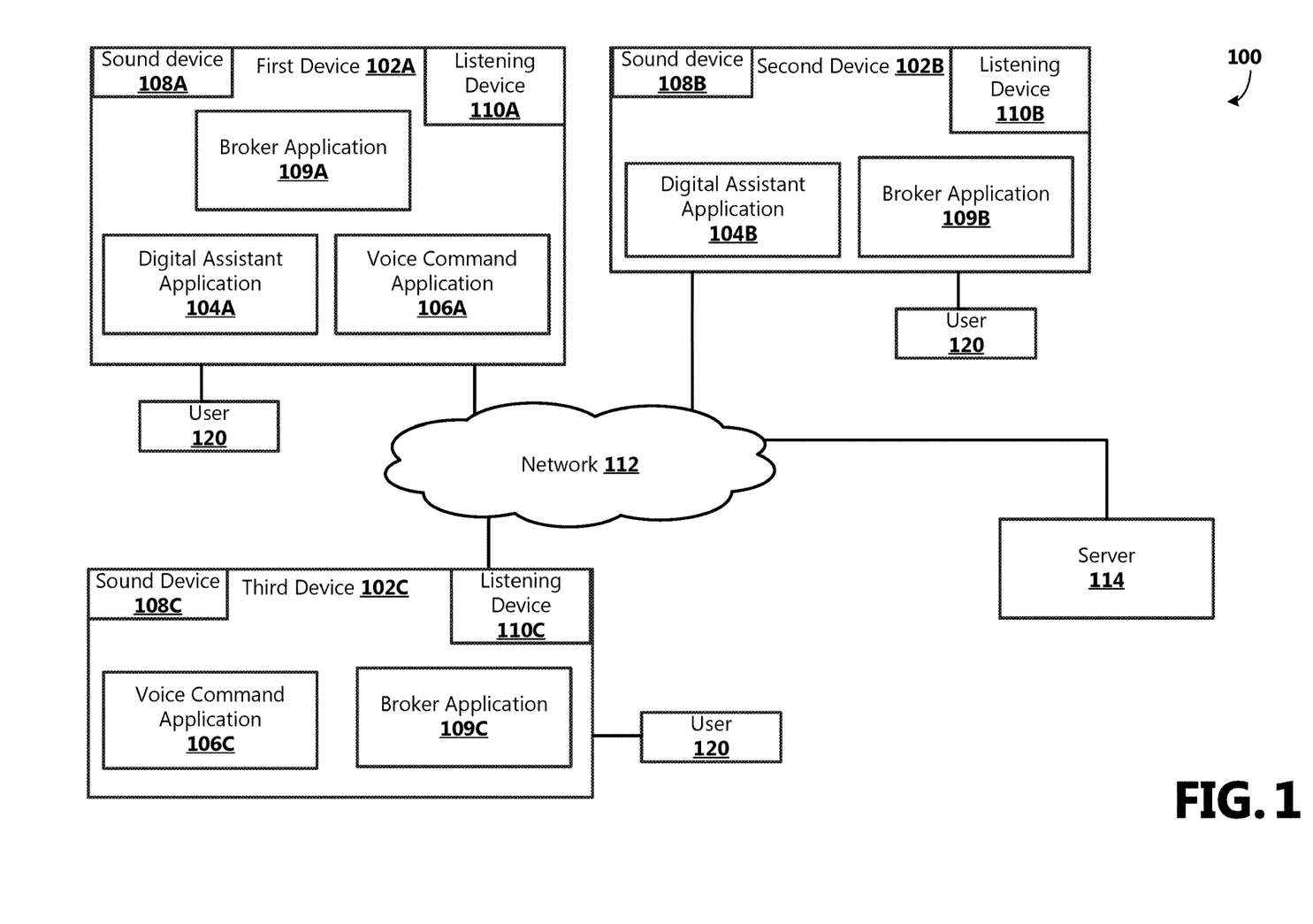
FIG. 1 is a block diagram showing an example operating environment including components of a system in which disclosed embodiments are practiced.

With reference now to FIG. 1, a block diagram of an example operating environment 100 illustrating aspects of an example system for determining a target device for a voice command is shown. The example operating environment 100 includes a first user device 102A, a second user device 102B, and a third user device 102C (collectively referred to as user device 102 unless stated otherwise).

In an example aspect, each of the user devices 102 may be one or more of a tablet computing device, a desktop computer, a mobile communication device, a laptop computer, a laptop/tablet hybrid computing device, a large screen multi-touch display, a gaming device, a smart television, a wearable device, or other type of computing device. The hardware of these computing devices is discussed in greater detail in regard to FIGS. 5, 6A, and 6B. One or more of the user devices 102 are associated with a user 120.

As shown in FIG. 1, first user device 102A includes a digital assistant application 104A, a voice command application 106A, a sound device 108A, a listening device 110A, and a broker application 109A. Second user device 102A includes a digital assistant application 104B, a voice command application 106B, a sound device 108B, a listening device 110B, and a broker application 109B. Third user device 102C includes a digital assistant application 104C, a voice command application 106C, a sound device 108C, a listening device 110C, and a broker application 109C. Each digital assistance application 104A-C (collectively 104), voice command application 106A-C (collectively 106), sound device 108A-C (collectively 108), listening device 110A-C (collectively 110) and broker application 109A-C (collectively 109) may be the same or different than those found on other user devices 102. For example, two user devices 102 of the plurality of devices may run a first digital assistant application 104 and another user device 102 of the plurality of devices may run a second digital assistant application 104 (including a different version of the first digital assistant application 104).

Digital assistant application 104 is a software agent operable to perform tasks or services for user 120. Digital assistant application 104 is operable to recognize natural voice without the requirement for a keyboard input and answer questions using information from a search engine. For example, digital assistant application 104 is operable to natural language processing (NLP) to match user's voice input to execute commands. In addition, digital assistant application 104 is operable to continually learn using artificial intelligence techniques using machine learning.

In an example aspect, digital assistant application 104 is integrated into an operating system of user device 102. In another example aspect, digital assistant application 104 is built into an instant messaging application on user device 102. In yet another example aspect, digital assistant application 104 is provided on user device 102 as an independent application. In yet another example aspect, digital assistant application 104 is enabled on user device 102 via a web interface. Digital assistant application 104 may be one of Microsoft's CORTANA®, Amazon's ALEXA®, Google's ASSISTANCE™, Apple's SIRI®, Facebook's M™, etc.

Voice command application 106 is operable to control user device 102 by means of user's voice. For example, voice command application 106 enables user 120 to operate user device 102 hands free. For example, voice command application 106 enables user 120 to dial a telephone number from user device 102. In examples, voice command application 106 is speaker independent and is operable to respond to multiple voices, regardless of accent or dialectical influences. In some examples, voice command application 106 is capable of responding to several commands at once, separating vocal messages, and providing appropriate feedback, accurately imitating a natural conversation. In examples, voice command application 106 is operable to understand a plurality of different commands and to retain a predetermined number of vocal messages of predetermined length of words or a time period. In some examples, voice command application 106 includes voice interactive applications such as a dictation application.

In an example aspect, voice command application 106 is integrated into an operating system of user device 102. In another example aspect, voice command application 106 is built into an instant messaging application on user device 102. In yet another example aspect, voice command application 106 is provided on user device 102 as an independent application. In yet another example aspect, voice command application 106 is enabled on user device 102 via a web interface.

Digital assistant application 104 and voice command application 106 may be thick client applications, which are stored locally on user device 102, or may be thin client applications (i.e., web applications) that reside on a remote server and accessible over a network. A thin client application may be hosted in a browser-controlled environment or coded in a browser-supported language and reliant on a common web browser to render the application executable on user device 102.

Broker application 109 is operable to determine a weight associated with the voice command detected at a given device 102, exchange (transmit and receive) the determined weights among a plurality of user devices 102 that received the voice command, and determine a target device for the detected voice command. Broker application 109 could be a thick client application or a thin client application. In example aspect, broker application 109 is discussed in greater detail with respect to FIG. 2 in the following part of this disclosure.

Sound device 108 is a transducer (more specifically, an electroacoustic transducer) which is operable to convert an electrical audio signal into a corresponding sound wave (or simply sound). The sound is emitted at a predetermined frequency range (or a decibel range). In example aspects, sound device 108 is a speaker. Listening device 110 is a transducer operable to convert sound into electrical signal. In example aspects, listening device 110 is a microphone.

Although each user device 102 is shown to include only one sound device 108 and only one listening device 110, it will be apparent to a person with an ordinary skill in the art after reading this disclosure that each user device 102 may include more than one sound device 108 and more than one listening device 110. Similarly, although each user device 102 is shown to include only one digital assistance application 104 and only one voice command application 106, it will be apparent to a person of ordinary skill in the art after reading this disclosure that each user device 102 may include more than one digital assistance application 104, more than one voice command application 106, or only one of a digital assistance application 104 and voice command application 106.

In an example aspect, each user device 102 includes one or more communication interfaces (not shown) to communicate with other devices, such as, with a second user device 102B, a third user device 102C, and a server 114. For example, first user device 102A includes a wire communication interface where an Internet cable can be attached. In addition, first user device 102A includes a wireless communication interface, such as a Bluetooth interface, a cellular network interface, a wireless local area network interface. Such communication interfaces are discussed in greater detail with respect to FIGS. 5, 6A, and 6B in the following parts of the disclosure.

Second user device 102B includes a digital assistance application 104B, a sound device 108B, a listening device 110B, and a broker application 109B. In an example aspect, second user device 102B is a personal digital assistant device. For example, second user device 102B may be a smart speaker such as Amazon's ECHO® or Google's HOME®. In an example aspect, second user device 102B includes one or more communication interfaces (not shown) to communicate with other devices, such as, with first user device 102A, third user device 102C, and server 114.

Third user device 102C includes a voice command application 106C, a sound device 108C, a listening device 110C, and a broker application 109C. In an example aspect, third user device 106C includes a voice control device which is controlled by means of human voice. For example, third user device 106C may include a home appliance (i.e. a refrigerator, a television, a heating, ventilation and air conditioning (HVAC) device, a smart speaker, etc.) and/or a vehicle (e.g., a car). In another example, third user device 102B may be a gaming console (for example, Microsoft's XBOX®, Sony's PLAYSTATION®, etc.), an automobile, and a wearable device. In an example aspect, third user device 102C includes one or more communication interfaces (not shown) to communicate with other devices, such as, with first user device 102A, second user device 102B, and server 114.

In some aspects, first user device 102A, second user device 102B, and third user device 102C are operative to communicate with server 114 over a network 112. Network 112 may be any type of network capable of facilitating communications between user devices 102 and server 114. Examples of such networks include, but are not limited to, LANs, WANs, cellular networks, and/or the Internet. In some examples, server 114 includes one or more computing devices, such as the computing environment illustrated in FIG. 5. In examples, server 114 is a distributed server or a cloud server.

Although example operating environment 100 illustrates only three user devices 102A, 102B, and 102C, it will be foreseeable to a person of ordinary skill in the art that example operating environment 100 may contain fewer or more devices than shown in FIG. 1. For example, operating environment 100 may include multiple first user devices 102A, second user devices 102B, or third user devices 102C. In another example, an operating environment 100 may include different combinations and different numbers of first user devices 102A, second user devices 102B, and/or third user devices 102C.

Figure 2:
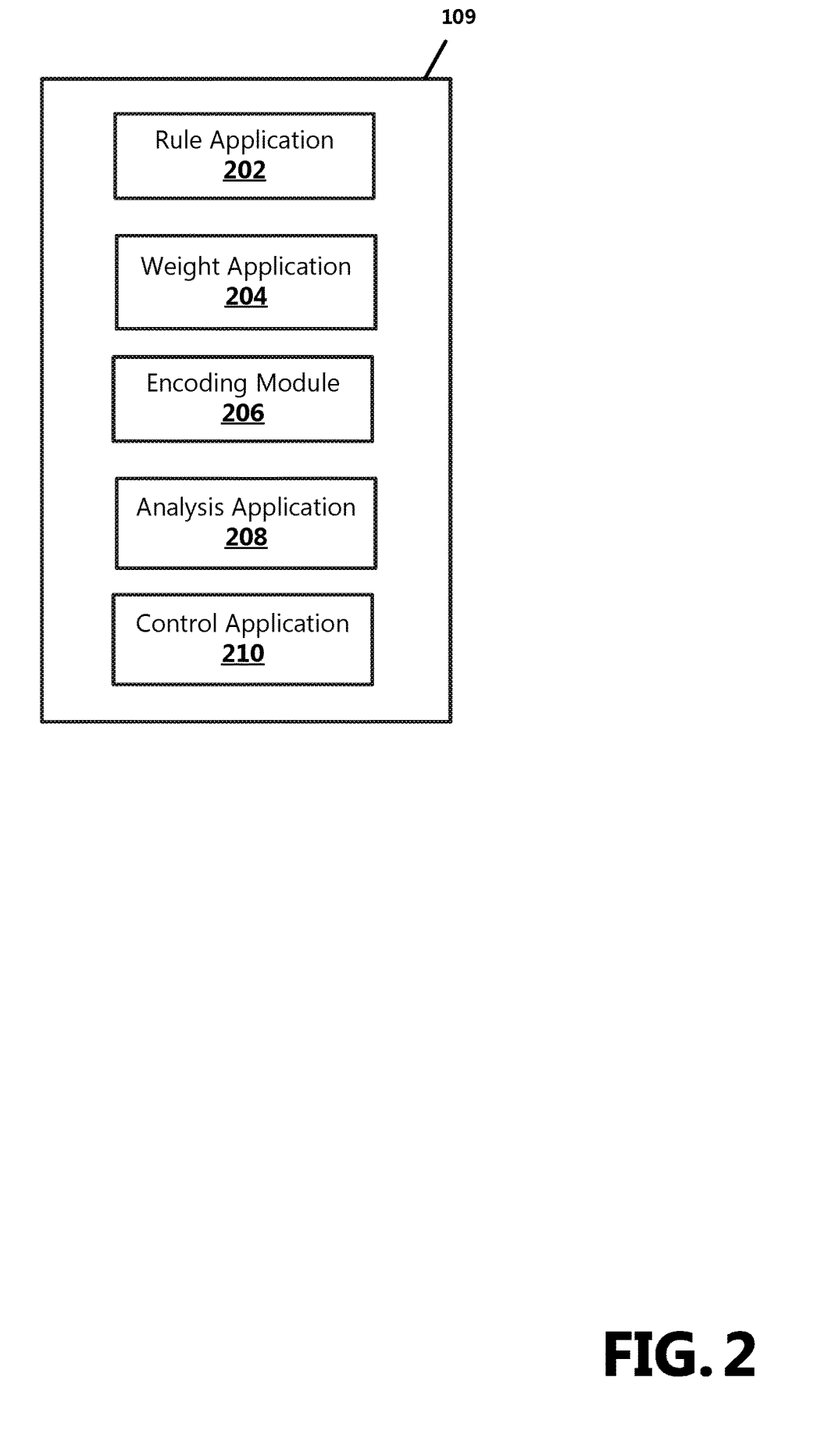
FIG. 2 is a block diagram showing components of a broker application.

FIG. 2 illustrates a block diagram illustrating components of broker application 109. Broker application 109 is operable to determine a target device for a detected voice command. As illustrated in FIG. 2, broker application 109 includes a rule application 202, a weight application 204, an encoding application 206, an analysis application 208, and a control application 210.

Rule application 202 includes one or more rules for determining a weight for the detected voice command at user device 102. In example aspects, the rules include a list of one or more criteria and rules for determining a corresponding criterion weight. The criteria include a sound volume of the detected voice command, a user assigned weight for user device 102, a device category for user device 102, and a device context. The rules can include a rule for determining the criterion weight for each of the listed criteria. For example, for the sound volume criteria, the rules can include a sliding scale for the criterion weight and the sound volume. In another example, the rule can specify a corresponding weight and a decibel level of the sound volume for the detected voice command. In example aspects, a higher weight is assigned for a higher sound volume of the detected voice command.

Similarly, the rules can define an inherent weight for user device 102. For example, user 120 can assign the inherent weight for each user device 102 based on a device category. In addition, user 120 may define the inherent weight for user device 102 based on a location of the device. For example, at home, a digital assistant device is assigned a higher inherent weight than a mobile phone or a laptop computer. While at work, the mobile phone will have a higher assigned inherent weight than the laptop computer.

In example aspects, the rules for the device context criteria include assigning criterion weight to the detected voice command based on whether user device 102 is active and whether a device screen is switched ON/OFF. For example, a higher criterion weight is assigned to the detected voice command at user device 102 with its screen switched ON than another user device 102 with its screen switched OFF. In another example, a higher criterion weight is assigned to the detected voice command at user device 102 which is active than another user device 102 which is not active. In example aspects, user device 102 is active when it is in use.

In example aspects, the criteria and rules for assigning criterion weights for the detected voice command are configurable. For example, user 120 can add one or more criteria to the list, delete one or more criteria from the list, and restrict application of one or more listed criteria based on one or more triggers. In another example, user 120 can add one or more rules, restrict/expand application of one or more rules based on a location of user device 102, and define one or more location specific rules for determining the criterion weights.

Weight application 204 is operable to determine a weight for the detected voice command at user device 102. Weight application 204 is operable to determine an overall weight as well as a criterion weights corresponding to one or more weight criteria. For example, weight application 204 is operable to determine the criterion weights corresponding to the one or more weight criteria based on the rules listed in rule application 202. In example aspects, weight application 204 is operable to aggregate the criterion weights to determine the overall weight for the voice command. In example aspects, the overall weight is determined by aggregating one or more selected criterion weights rather than all of the criterion weights. In example aspects, such rules for selecting one or more criterion weights are triggered based on a location or status of user device 102. In other example aspects, during the aggregation a selected criterion is accorded more weightage over other weight criterion.

Encoding application 206 is operable to encode the determined weight for exchange with one or more user devices 102. The determined weight is encoded into one or more encoding patterns. For example, encoding application 206 is operable to encode the determined weight into digital signal having a string of zeros and ones. In another example, encoding application 206 is operable to encode the weight into sound signal comprising sound pulses of varying decibel levels on a predetermined range. For example, a higher decibel level sound pulse is created for a weight than for a lower weight for a detected voice command. In an aspect, the encoding pattern is configurable.

In some aspects, encoding application 206 is operable to encode the overall weight or the aggregated weight of the voice command. In other aspects, encoding application 206 is operable to encode each of the criterion weights for the weighing criteria in a predetermined order. For example, a first portion of the encoded weight includes a first criterion weight corresponding to a first criteria, a second portion of the encoded weight includes a second weight criterion corresponding to a second criteria, and so on. In such examples, a number of encoding bits or characters for each portion are predetermined. Similarly, for sound pulses, a first pulse represents a first criterion weight corresponding to a first criteria, a second pulse represents a second weight criterion corresponding to a second criteria, and so on.

Analysis application 208 is operable to analyze the determined weight and weights exchanged with other user devices 102. For example, analysis application 208 is operable to determine a highest weight among the exchanged weights. In some aspects, the highest weight is determined based on the aggregated weights exchanged between user devices 102. In other aspect, the highest weight is determined by determining a highest weight for a predetermined criterion. For example, the criterion weights for a first criterion are compared first to determine the highest weight. If there is a tie for the first criterion weights, then the criterion weights for a second criterion are compared to determine the highest weight, and so on.

In some aspects, an order of the criteria for the weight comparison is predetermined. In another aspect, the order comparison for the criteria is determined based on a location of user device 102. For example, a different order is used at a dwelling that at a workplace. In some aspects, analysis application 208 is further operable to compare the determined highest weight with a local weight determined at user device 102. For example, analysis application 208 is operable to determine whether the local weight is the highest weight.

Control application 210 is operable to control behavior of user device 102 with respect to the voice command. For example, control application 210 is operable to determine and signal user device 102 to respond to the voice command if the local weight is determined to be the highest weight for the voice command. In some aspects, control application 210 is operable to send a signal to other devices in a predetermined range declaring user device 102 to be the target device for the voice command. In other aspects, control application 210 is operable to send a signal to all user devices 102 in the predetermined range informing them of the determined target device for the voice command. In some aspects, control application 210, after determining the target device, is operable to send a signal to other user devices in the predetermined range to not to respond to a next predetermined number of voice commands or to next voice commands detected for a predetermined time period from the instant voice command.

Figure 3:
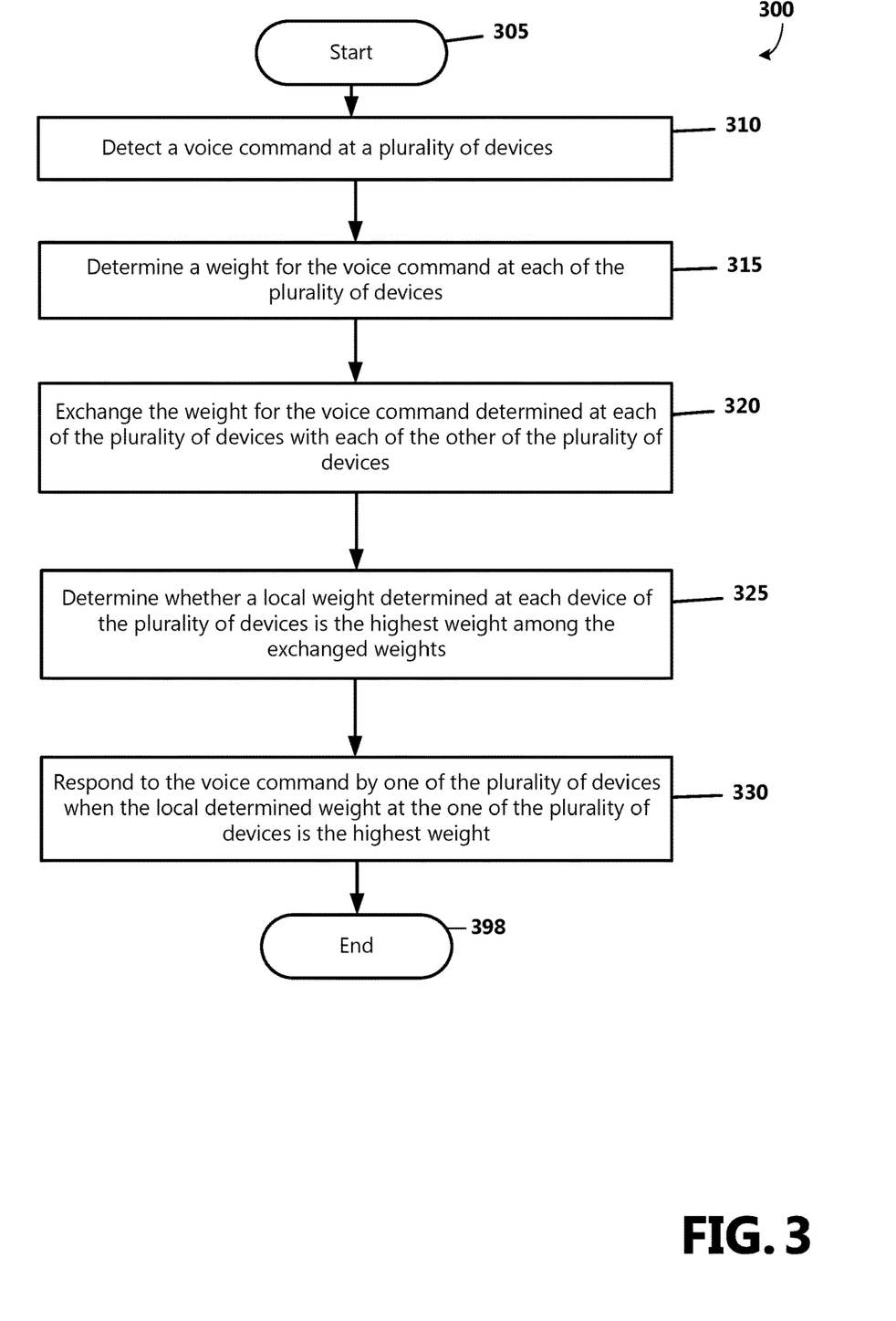
FIG. 3 is a flow chart showing general stages involved in an example method for determining a target device for a voice command.

FIG. 3 is a flow chart showing general stages involved in an example method 300 for determining a target device for a voice command. More specifically, method 300 a flowchart for determining a target device among a plurality of user devices within an audible range of a voice command. In some aspects, steps of method 300 are executed at one or more user device 102. With reference now to FIG. 3, the method 300 begins at start OPERATION 305, and proceeds to OPERATION 310, where a voice command is detected. The voice command is detected at a plurality of devices within an audible range of the voice command. The plurality of devices are each enabled to detect and respond to voice commands. For example, when user 120 gives a voice command at home, the given voice command is detected at one or more mobile devices, one or more gaming devices, one or more laptop devices, one or more personal assistant devices, one or more home appliances, etc.

After detecting the voice command at OPERATION 310, method 300 proceeds to OPERATION 315, where a weight for the voice command is determined at each device of the plurality of devices. For example, the weight is determined at each user device 102 where the voice command is detected. In some aspects, the weight is determined only when the voice command is above a predetermined decibel threshold. In other aspects, the weight is determined only when user device 102 is operable to respond to user 120 associated with the voice command. In some aspects, the weight is determined only when user device 102 is in active mode. As discussed above, weight application 206 is operable to determine the weight of the detected voice command. Moreover, and as discussed above, the determined weight is an overall weight and/or criteria wise weights for the detected voice command.

After determining the weight of the voice command at OPERATION 315, method 300 proceeds to OPERATION 320, where the determined weight is exchanged with each of the other devices of the plurality of devices. For example, the determined weight is exchanged with the other devices of the plurality of devices in a predetermined range. For example, the determined weight is broadcasted as an electrical signal, IR signal, light signal, or sound signal. The electrical signals include signals sent over a wired medium or a wireless medium (such as, WiFi, Bluetooth, local area network, etc.). The other devices of the plurality of devices in the predetermined range are operable to detect the broadcasted signal. For example, the determined weights are exchanged over a local area network, over a Bluetooth network, a home area network, etc. The sound signal is broadcasted by sound device 108 at a non-audible frequency that is detectable by listening devices 110. In some aspects, the determined weights are unicasted to other user devices 102 in the predetermined area. In other aspects, the determined weights are exchanged via server 114.

In example aspects, the determined weights are exchanged as messages or signals of fixed length. The length of the messages or the signals is configurable. For example, the message includes 16 bits or pulses. In addition, fields or parts of the message are arranged to indicate a hierarchy of criterion weights. For example, a first field in the message indicates a criterion weight associated with a first weight criterion, a second field indicates a criterion weight associated with a second weight criterion, and so on. Fields containing the criterion weight are of equal length. Values in the fields indicate the criterion weight. In some aspects, lengths of the field represent corresponding criterion weight.

Similarly, a first pulse in the sound signal indicates the criterion weight associated with the first weight criterion, a second pulse indicates the criterion weight associated with the second weight criterion, and so on. In some aspects, decibel levels of the sound pulses represent corresponding criterion weight. In some examples, the criterion weight associated with the first weight criterion is exchanged first, and then the criterion weight associated with the second weight criterion is exchanged, and so on. In other examples, the criterion weight associated with the second weight criterion is exchanged only if needed.

After exchanging the determined weights for the voice command at OPERATION 325, method 300 proceeds to OPERATION 330, where each device of the plurality of devices is operable to determine whether a local determined weight is the highest weight among the exchanged weights. For example, each device of the plurality of devices are operable to compare the local weight (i.e., the weight determined for the voice command at the instant device) with other weights received from the other devices of the plurality of devices to determine whether there is at least one other weight greater than the local weight.

In some examples, each device of the plurality of devices is operable to determine a highest weight among the exchanged weights. After determining the highest weight, each device of the plurality of devices is operable to determine whether the determined highest weight is the same as the local weight to determine whether the local weight is the highest weight among the exchanged weights. In other examples, the highest weight is determined by comparing the weight associated with a predetermined criterion. In some examples, the highest weight is determined through successive comparisons. A method for successive comparisons is described in greater detail with respect to FIG. 4 in the following part of the specification.

After determining whether the local weight at each device of the plurality of devices is the highest weight among the exchanged weights at OPERATION 325, method 300 proceeds to OPERATION 330, where one device of the plurality of devices is operable to respond to the voice command when the local weight at the one device of the plurality of devices is determined to be the highest weight among the exchanged weights. In example aspects, the other devices of the plurality devices having local weights less than the highest weight are operable to ignore the detected voice command. After responding to the voice command at OPERATION 330, method 300 ends at OPERATION 398.

Figure 4:
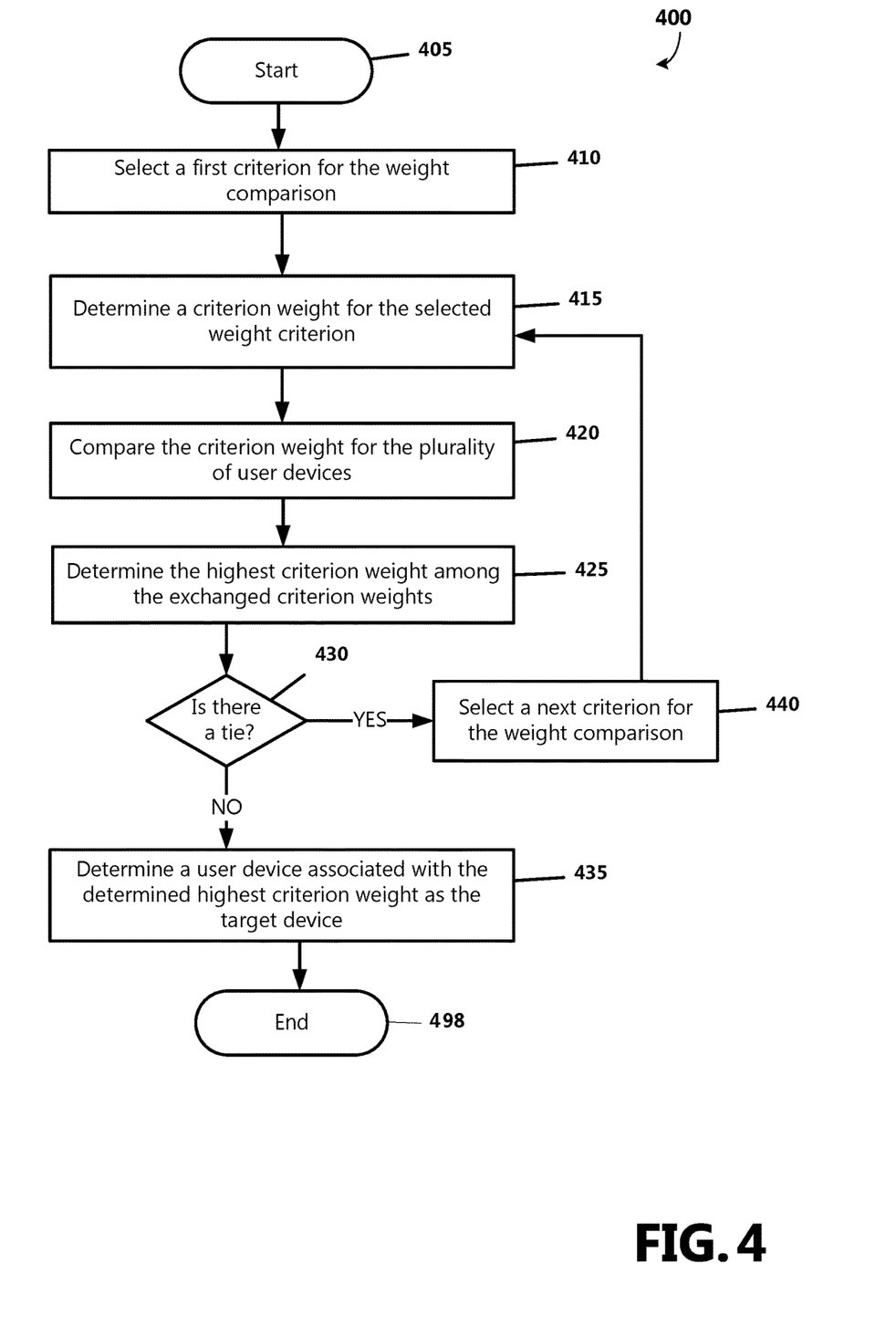
FIG. 4 is a flow chart showing general stages involved in an example method for successive comparisons of criterion weights.

FIG. 4 is a flow chart showing general stages of an example method 400 for successive comparisons of weights associated with a voice command. The successive comparison is used when user devices 102 are enabled to exchange criterion weights associated with multiple weighing criteria for weighting of the voice command.

With reference now to FIG. 4, the method 400 begins at start OPERATION 405, and proceeds to OPERATION 410, where a first weight criterion for the weight comparison is selected. The first weight criterion is selected from a hierarchy of the weight criteria provided to user device 102. The hierarchy is dynamically configurable. In addition, the hierarchy is reconfigured change based on a location or a context of user device 102. In addition to the hierarchy, a random seed is provided to ensure one device wins if associated criterion weights for all other criteria are equal. In some examples, the criterion weights are compared in order of their exchange or in order of their placement in the weight exchange messages among user devices 102.

After selecting the first criteria for the weight comparison at OPERATION 410, method 400 proceeds to OPERATION 415, where a criterion weight corresponding to the selected weight criteria is determined. The criterion weight is determined from the exchanged weights. For example, each of a plurality of devices in a predetermined range is operable to exchange its determined criterion weight with the other of the plurality of devices.

After determining the criterion weights for the selected weight criterion at OPERATION 415, method 400 proceeds to OPERATION 420, where the criterion weights are compared. For example, the criterion weight determined at one device of the plurality of devices is compared with criterion weights exchanged from the other devices of the plurality of devices. After comparing the criterion weights at OPERATION 420, method 400 proceeds to OPERATION 425, where the highest criterion weight among the criterion weights is determined. In some aspects, OPERATIONS 420 and 425 are combined into one operation where each device of the plurality of devices determines whether a local determined criterion weight is the highest weight among criterion weights exchanged with the other device of the plurality of devices.

After determining the highest criterion weight at OPERATION 425, method 400 proceeds to DECISION OPERATION 430, where method 400 determines whether there is a tie for the highest weight between two or more criterion weights. In some examples, the highest criterion weight is tied when two or more criterion weights determined for the voice command at two or more devices of the plurality of devices are equal.

If there is no tie for the highest criterion weight at DECISION OPERATION 430, method 400 proceeds to OPERATION 435, where a user device 102 associated with the highest criterion weight is determined as the target device for the voice command. However, if there is a tie for the highest criterion weight at DECISION OPERATION 430, method 400 proceeds to OPERATION 440, where a next weight criterion for the weight comparison is determined.

After determining the next weight criterion for the weight comparison at OPERATION 440, method 400 loops back to OPERATION 415. In some examples, if there is a tie for the highest criterion weight at DECISION OPERATION 430, method 400 may use the random seed weight to determine the target device. In some examples, the random seed weight is used to determine the target device only when there is tie for at least two successive criterion weight comparisons. After determining the target device at OPERATION 435 method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
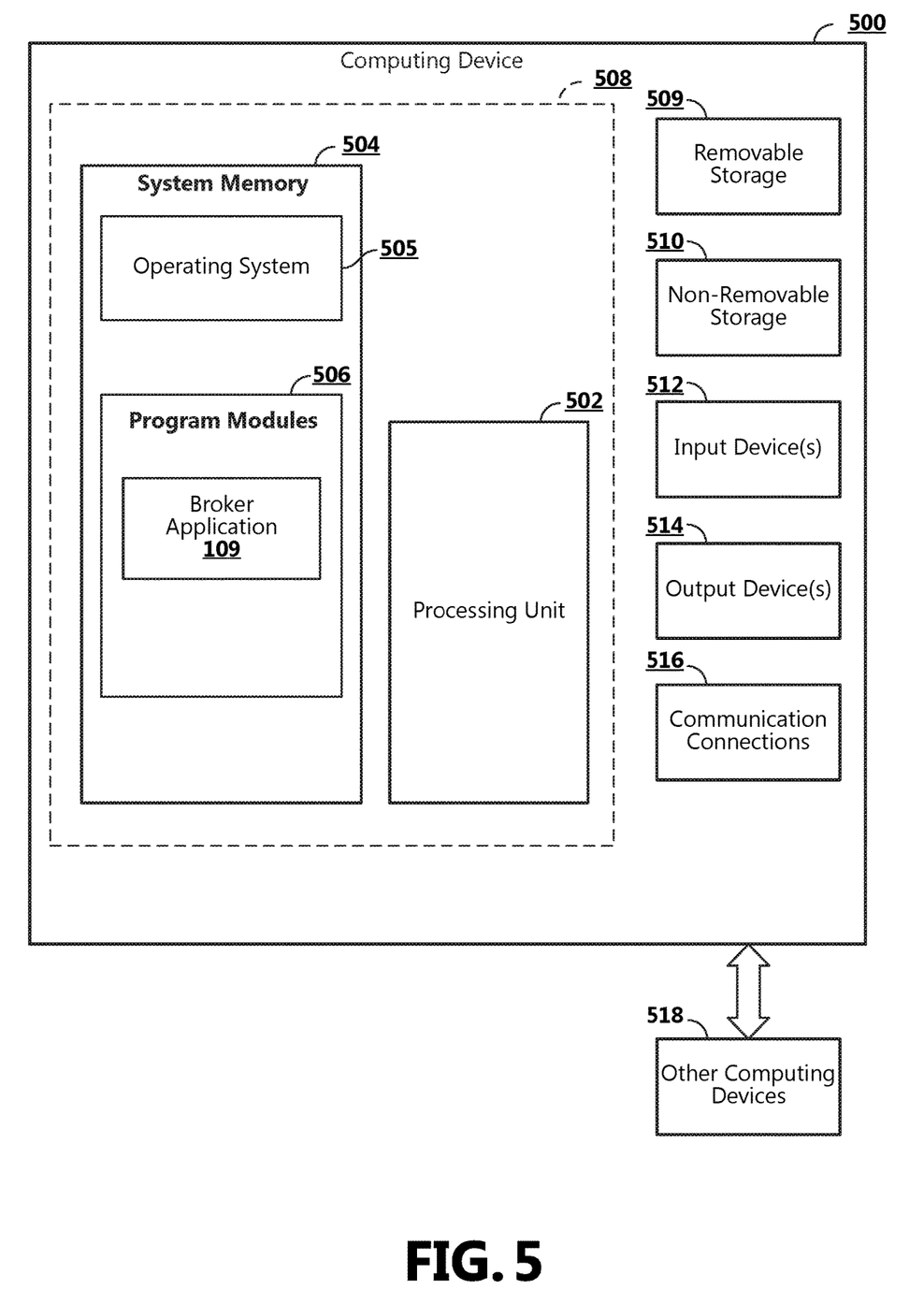
FIG. 5 is a block diagram illustrating example physical components of a computing device.
Figure 6A:
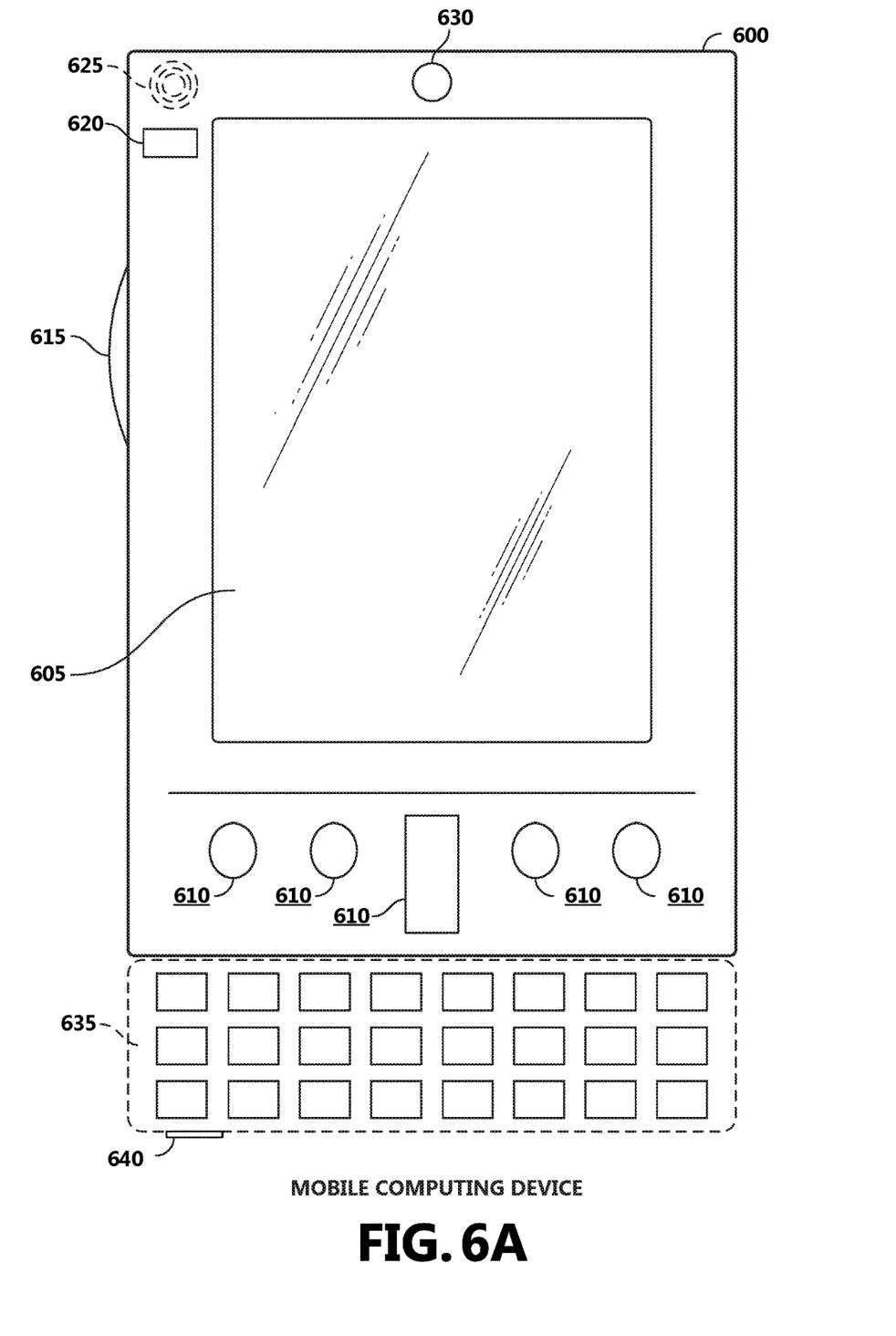
FIGS. 6A and 6B are simplified block diagrams of a mobile computing device.
Figure 6B:
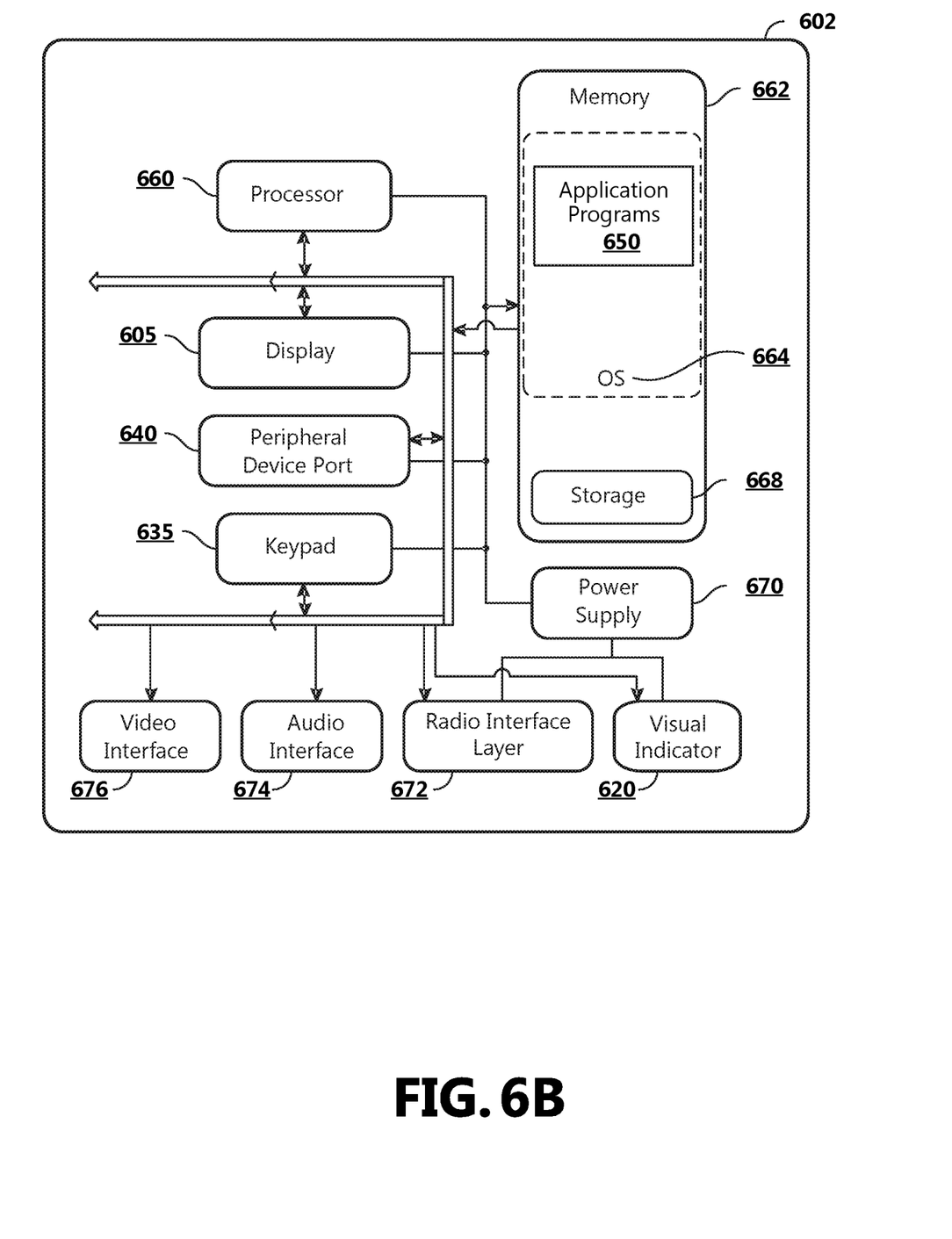

FIGS. 5, 6A, and 6B and the associated descriptions provide a discussion of a variety of operating environments in which examples are practiced. However, the devices and systems illustrated and discussed with respect to FIGS. 5, 6A, and 6B are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure may be practiced. In a basic configuration, computing device 500 includes at least one processing unit 502 and a system memory 504. According to an aspect, depending on the configuration and type of computing device, system memory 504 comprises, but is not limited to, volatile storage (e.g., random access memory), non-volatile storage (e.g., read-only memory), flash memory, or any combination of such memories. According to an aspect, system memory 504 includes an operating system 505 and one or more program modules 506 suitable for running software applications. According to an aspect, one or more program modules 506 include broker application 109 suitable for determining a target device for a voice command. Operating system 505, for example, is suitable for controlling the operation of computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, computing device 500 has additional features or functionality. For example, according to an aspect, computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., broker application 109) perform processes including, but not limited to, one or more of the stages of the methods 300 and 400 illustrated in FIGS. 3 and 4 respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, computing device 500 has one or more input device(s) 512 such as a keyboard, a mouse, a pen, a sound input device, a touch input device, etc. Output device(s) 514 such as a display, speakers, a printer, etc. are also included according to an aspect. The aforementioned devices are examples and others may be used. According to an aspect, computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. System memory 504, removable storage device 509, and non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by computing device 500. According to an aspect, any such computer storage medium is part of computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, mobile computing device 600 is a handheld computer having both input elements and output elements. Mobile computing device 600 typically includes a display 605 and one or more input buttons 610 that allow the user to enter information into the mobile computing device 600. According to an aspect, display 605 of mobile computing device 600 functions as an input device (e.g., a touch screen display). If included, an optional side input element 615 allows further user input. According to an aspect, side input element 615 is a rotary switch, a button, or any other type of manual input element. In alternative examples, mobile computing device 600 incorporates more or less input elements. For example, display 605 may not be a touch screen in some examples. In alternative examples, mobile computing device 600 is a portable phone system, such as a cellular phone. According to an aspect, mobile computing device 600 includes an optional keypad 635. According to an aspect, optional keypad 635 is a physical keypad. According to another aspect, optional keypad 635 is a "soft" keypad generated on the touch screen display. In various aspects, output elements include the display 605 for showing a graphical user interface (GUI), a visual indicator 620 (e.g., a light emitting diode), and/or an audio transducer 625 (e.g., a speaker and/or a microphone). Audio transducer 625 includes sound device 108 and listening device 110. In some examples, mobile computing device 600 incorporates a vibration transducer for providing the user with tactile feedback. In yet another example, mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, mobile computing device 600 incorporates a system (i.e., an architecture) 602 to implement some examples. In one example, system 602 is implemented as a "smart phone" capable of running one or more applications (e.g., browser, e-mail, calendaring, contact managers, messaging clients, games, and media clients/players). In some examples, system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, broker application 109 is loaded into memory 662 as one or more application programs 650. System 602 also includes a non-volatile storage area 668 within the memory 662. Non-volatile storage area 668 is used to store persistent information that should not be lost if system 602 is powered down. Application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into memory 662 and run on mobile computing device 600.

According to an aspect, system 602 has a power supply 670, which is implemented as one or more batteries. According to an aspect, power supply 670 further includes an external power source, such as an AC adapter or a powered docking cradle that supplements or recharges the batteries.

According to an aspect, system 602 includes a radio 672 that performs the function of transmitting and receiving radio frequency communications. Radio 672 facilitates wireless connectivity between system 602 and the "outside world," via a communications carrier or service provider. Transmissions to and from radio 672 are conducted under control of operating system 664. In other words, communications received by radio 672 may be disseminated to application programs 650 via operating system 664, and vice versa.

According to an aspect, a visual indicator 620 is used to provide visual notifications and/or an audio interface 674 is used for producing audible notifications via the audio transducer 625. In the illustrated example, visual indicator 620 is a light emitting diode (LED) and audio transducer 625 is a speaker. These devices may be directly coupled to power supply 670 so that when activated, they remain on for a duration dictated by the notification mechanism even though processor 660 and other components might shut down for conserving battery power. The LED may be programmed to remain on indefinitely until the user takes action to indicate the powered-on status of the device. Audio interface 674 is used to provide audible signals to and receive audible signals from the user. For example, in addition to being coupled to audio transducer 625, audio interface 674 may also be coupled to a microphone to receive audible input, such as to facilitate a telephone conversation. According to an aspect, system 602 further includes a video interface 676 that enables an operation of an on-board camera 630 to record still images, video stream, and the like.

According to an aspect, a mobile computing device 600 implementing system 602 has additional features or functionality. For example, mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on mobile computing device 600, as described above. According to another aspect, the data is stored on any number of storage media that is accessible by the device via the radio 672 or via a wired connection between mobile computing device 600 and a separate computing device associated with mobile computing device 600, for example, a server computer in a distributed computing network, such as the Internet. As should be appreciated such data/information is accessible via mobile computing device 600 via radio 672 or via a distributed computing network. Similarly, according to an aspect, such data/information is readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A voice-commanded device method of operation, comprising:
   detecting a voice command;
   determining a local weight based on a weight criterion;
   receiving, from at least one other voice-commanded device that has detected the voice command, a received weight that is locally determined at the at least one other voice-commanded device based on the same weight criterion;
   transmitting the local weight to the at least one other voice-commanded device;
   determining that the local weight is higher than the received weight; and
   based on determining that the local weight is higher than the received weight, self-designating as the target device for responding to the detected voice command and, subsequently, responding to the voice command.

2. The method of operation of claim 1, wherein the weight criterion comprises a plurality of weight criteria.

3. The method of operation of claim 2, wherein the local weight and the received weight are determined based on an aggregation of at least a portion of the plurality of weight criteria.

4. The method of operation of claim 2, wherein at least one of the plurality of weight criteria comprises a random seed weight.

5. The method of operation of claim 2, wherein at least one of the plurality of weight criteria comprises an inherent weight based on a type of the voice-commanded device.

6. The method of operation of claim 2, wherein at least one of the plurality of weight criteria comprises a weight criterion based on an active/non-active status of the voice-commanded device.

7. The method of operation of claim 2, wherein at least one of the plurality of weight criteria comprises a weight criterion based on an ON/OFF status of a display of the voice-commanded device.

8. The method of operation of claim 1, further comprising receiving a predetermined hierarchy of a plurality weight criterion.

9. The method of operation of claim 8, wherein the hierarchy of the plurality of weight criteria is configurable.

10. The method of operation of claim 8, wherein the hierarchy changes in accordance with a location of the voice-commanded device.

11. The method of operation of claim 1, wherein detecting the voice command includes determining the voice command meets a predetermined decibel threshold.

12. The method of operation of claim 1, wherein two or more received weights are received from two or more other voice-commanded devices that each detected the voice command.

13. The method of operation of claim 1, wherein the received weight is received in the form of a broadcasted electrical signal.

14. The method of operation of claim 1, wherein the received weight is received in the form of a broadcasted infra-red (IR) signal.

15. The method of operation of claim 1, wherein the received weight is received in the form of a broadcasted light signal.

16. The method of operation of claim 1, wherein the received weight is received in the form of a broadcasted sound signal.

17. A voice-commanded device method of operation, comprising:
   detecting a voice command;
   determining a first local weight based on a first weight criterion from a plurality of weight criteria;
   receiving, from at least one other voice-commanded device that has detected the voice command, a first received weight that is locally determined at the at least one other voice-commanded device based on the same first weight criterion;
   transmitting the first local weight to the at least one other voice-commanded device:
   determining that the first local weight is equal to the first received weight;
   based on the determination that first local weight is equal to the first received weight, determining a second local weight based on a second weight criterion from the plurality of weight criteria;
   receiving, from the at least one other voice-commanded device that has detected the voice command, a second received weight that is locally determined at the at least one other voice-commanded device based on the same second weight criterion;
   transmitting the second local weight to the at least one other voice-commanded device;
   determining that second local weight is higher than the second received weight; and
   based on determining that the second local weight is higher than the second received weight, self-designating as the target device for responding to the detected voice command and, subsequently, responding to the voice command.

18. The method of operation of claim 17, wherein the second weight criterion comprises a random seed weight.

19. A voice-commanded device method of operation comprising:
   detecting a voice command;
   determining a first local weight based on a first weight criterion comprising at least one of an inherent weight based on a type of the voice-commanded device, a weight criterion based on an active/non-active status of the voice-commanded device and a weight criterion based on an active/non-active status of the voice-commanded device;
   receiving, from at least one other voice-commanded device that has detected the voice command, a first received weight that is locally determined at the at least one other voice-commanded device based on the same first weight criterion;
   transmitting the first local weight to the at least one other voice-commanded device;
   determining that the first local weight is equal to the first received weight;
   based on the determination that first local weight is equal to the first received weight, determining a second local weight based on a second weight criterion from the plurality of weight criteria;
   receiving, from the at least one other voice-commanded device that has detected the voice command, a second received weight that is locally determined at the at least one other voice-commanded device based on the same second weight criterion;

transmitting the second local weight to the at least one other voice-commanded device;

determining that second local weight is higher than the second received weight; and based on determining that the second local weight is higher than the second received weight, self-designating as the target device for responding to the detected voice command and, subsequently, responding to the voice command.

* * * * *